(12) United States Patent
Payette et al.

(10) Patent No.: US 6,887,419 B2
(45) Date of Patent: May 3, 2005

(54) DE-GATING MOLD FOR INJECTION MOLDING OF ELASTIC MATERIALS

(75) Inventors: Dennis J. Payette, Port Washington, WI (US); Thomas W. Woloszyk, Sussex, WI (US); Stuart J. Nitschke, Sussex, WI (US); Brian Hartlmeier, Elm Grove, WI (US); John J. Hahn, Hartford, WI (US)

(73) Assignee: MGS Mfg. Group, Inc., Germantown, WI (US)

( * ) Notice: Subject to any disclaimer, the term of this patent is extended or adjusted under 35 U.S.C. 154(b) by 257 days.

(21) Appl. No.: 10/161,237

(22) Filed: May 31, 2002

(65) Prior Publication Data

US 2003/0222373 A1 Dec. 4, 2003

(51) Int. Cl.[7] .............................................. B29C 45/40
(52) U.S. Cl. ..................... 264/328.9; 264/161; 264/267; 264/328.8
(58) Field of Search .............................. 264/328.9, 161, 264/267, 328.8, 255, 179

(56) References Cited

U.S. PATENT DOCUMENTS

| | | | | |
|---|---|---|---|---|
| 4,410,479 A | * | 10/1983 | Cyriax | 264/255 |
| 4,752,199 A | * | 6/1988 | Arai | 425/130 |
| 5,861,120 A | * | 1/1999 | Yagi et al. | 264/255 |

* cited by examiner

Primary Examiner—Michael P. Colaianni
Assistant Examiner—Monica A. Fontaine
(74) Attorney, Agent, or Firm—Quarles & Brady LLP

(57) ABSTRACT

A multi-material runner gate system allows effective de-gating of elastomeric materials that would otherwise stretch and/or flex reducing de-gating forces at the gate upon separation of the molds.

8 Claims, 4 Drawing Sheets

DE-GATING MOLD FOR INJECTION MOLDING OF ELASTIC MATERIALS

CROSS-REFERENCE TO RELATED APPLICATIONS

STATEMENT REGARDING FEDERALLY SPONSORED RESEARCH OR DEVELOPMENT

BACKGROUND OF THE INVENTION

This invention relates generally to injection molding and more particularly to a mold that provides improved de-gating of parts molded from elastic material.

In injection molding, a thermoplastic material is forced under pressure into a mold cavity that defines the shape of the part being molded. A nozzle, providing the source of plastic material, communicates with the mold cavity through a sprue passage joining with one or more runner passages, in turn connecting to the mold cavity at corresponding gates. Generally, the gates are somewhat narrower than the runner passages to allow the sprue and runners (referring respectively to plastic remaining in the sprue and runner passages at the completion of the molding) to be broken away from the molded part at the gate in a process termed "de-gating".

De-gating may occur as a separate process after the part is ejected from the mold or automatic de-gating may be accomplished with certain mold designs. For example, a tunnel-gate, also known as a "hook" or "submarine" gate, may be used to capture the runner in one part of the mold portion, so that when the molded part is ejected, the retained runner is pulled from the part. The tunnel-gate takes its name from the fact that the runner passage, which normally extends along the part line of the mold, "tunnels" below the part line into one mold part and then "hooks" upward into the mold cavity. The runner is removed from the mold with a slight twisting and/or flexing of the runner.

Automatic de-gating using, for example, a tunnel-gate, is often unsuccessful with elastic materials. Elastic materials, by stretching, dissipate the de-gating force developed as the part is ejected. The inability to de-gate such parts without a secondary operation, increases the cost of molding parts using elastic materials.

BRIEF SUMMARY OF THE INVENTION

The present invention allows for automatic de-gating of parts molded of elastic materials. A runner support structure is molded within the runner passage from a material having low elasticity. The elastic material of the runner adheres to the runner support structure, the latter which serves to reinforce the runner. When the molded part is ejected, stretching of the runner is reduced, increasing the stress at the gate and ensuring proper de-gating. When the molded part is a "two shot" injection molding, using one shot of an elastic material and a second shot of a relatively inelastic material, the runner support structure may be molded during the injection of the inelastic material without the need to add process steps.

Specifically then, the present invention provides a method of de-gating a molded part produced by injection molding of an elastic material in a mold cavity. The method includes the steps of: (1) molding a runner support structure within a portion of the runner passage leading to the mold cavity by the injection of a substantially inelastic material into the runner passage, and (2) molding the part by the injection of elastic material into the mold cavity via the runner passage. The part is de-gated by a force on the runner formed in the runner passage, at least in part, transmitted through the runner support structure.

Thus, it is one object of the invention to provide automatic de-gating when molding parts from elastic materials. It is another object of the invention to allow runner passages to be freely designed without concern that cumulative stretch over the length of the runner may interfere with de-gating.

The method may be used in two shot molding operations employing an elastic and substantially inelastic material. In this case, the molding of the runner support structure may take place during the molding of the substantially inelastic material.

Thus, it is another object of the invention to provide a method of automatic de-gating of parts molded of elastic materials where the method is well adapted to two shot molding.

The step of forming the runner support structure may include fitting a blocking structure into a portion of the runner passage to prevent complete filling of the runner passage with the inelastic material during the molding of the runner support structure and then removing that blocking structure prior to molding with the elastic material. Conversely, the blocking structure may be fit into the portion of the runner passage during the molding with the elastic material and removed to allow the introduction of the inelastic material.

Thus, it is another object of the invention to make use of the same techniques used in two shot molding to produce the runner of the present invention.

The mold may have a part line separating two mold sections and the runner passage may be a tunnel-gate passing below the part line completely into one mold portion prior to entering the cavity.

Thus, it is another object of the invention to provide a de-gating system suitable for use with conventional tunnel-gate structures.

The runner support structure may be tapered in the direction of the gate.

Thus is another object of the invention to provide for a stress reducing interface between the relatively rigid runner support structure and the elastic portion of the runner such as minimizes separation or tearing at the interface between the runner support structure and the elastic material of the runner.

The foregoing and other objects and advantages of the invention will appear from the following description. In this description, reference is made to the accompanying drawings, which form a part hereof, and in which there is shown by way of illustration, a preferred embodiment of the invention. Such embodiment and its particular objects and advantages do not define the scope of the invention, however, and reference must be made therefore to the claims for interpreting the scope of the invention.

DETAILED DESCRIPTION OF THE PREFERRED EMBODIMENTS

Figure 1:
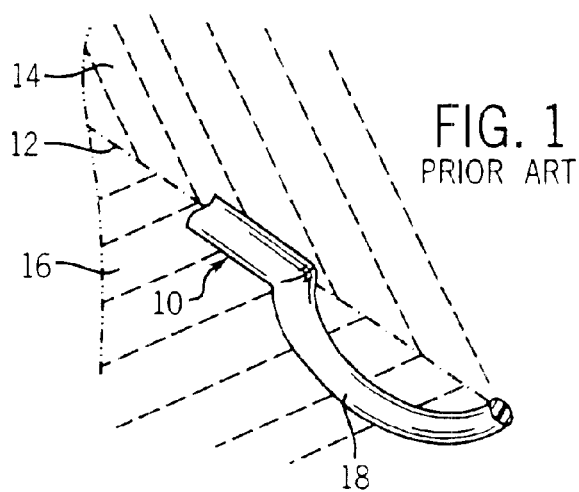
FIG. 1 is a perspective view of a prior art runner with a tunnel-gate such as has been described above.

Referring now to FIG. 1, a conventional runner 10 and tunnel-gate 18 extend along the part line 12 of a first and second mold section 14 and 16 defined by a passage for the injection of a thermoplastic material into a mold cavity (not shown). The runner 10 is released by separation of the mold sections 14 and 16, however, the tunnel-gate 18, passing through mold section 16, is held in place by mold section 16. Thus, when the molded part (not shown) is ejected, the runner 10 and tunnel-gate 18 held by the mold section 14, are pulled off the molded part.

After the runner 10 and tunnel-gate 18 are separated from the molded part, they may be removed from the mold section 16 by upward rotation of the runner 10 and/or flexing of the tunnel-gate 18 withdrawing it from its passage. To facilitate this process, the tunnel-gate 18 tapers to a narrower cross-section toward the molded part.

When a runner is composed of an elastic material, it may stretch sufficiently over its length to prevent the necessary concentration of stresses at the gate to allow automatic de-gating as described above. Accordingly, in the present invention, a multi-material runner is produced in which the elastic material of the runner is reinforced with a non-elastic material resisting runner stretching, better retention of the runner by the tunnel-gate, and improved ejection of the runner after molding.

In the following description and claims, the term "runner" will be used generally to refer both to runner 10 and also associated materials removed from the molded part including portions of the gate and/or sprue as context requires.

Figure 2:
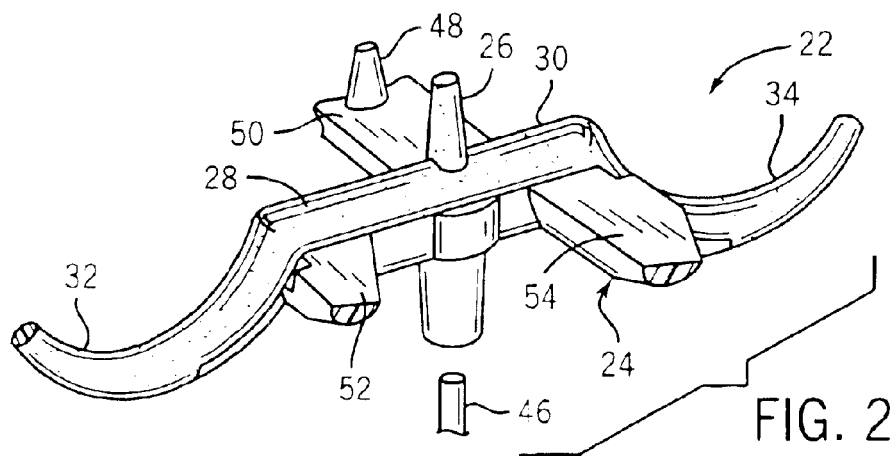
FIG. 2 is perspective view of a multi-material runner with a tunnel-gate per the present invention showing a runner support structure positioned beneath elastic material of a runner.
Figure 3:
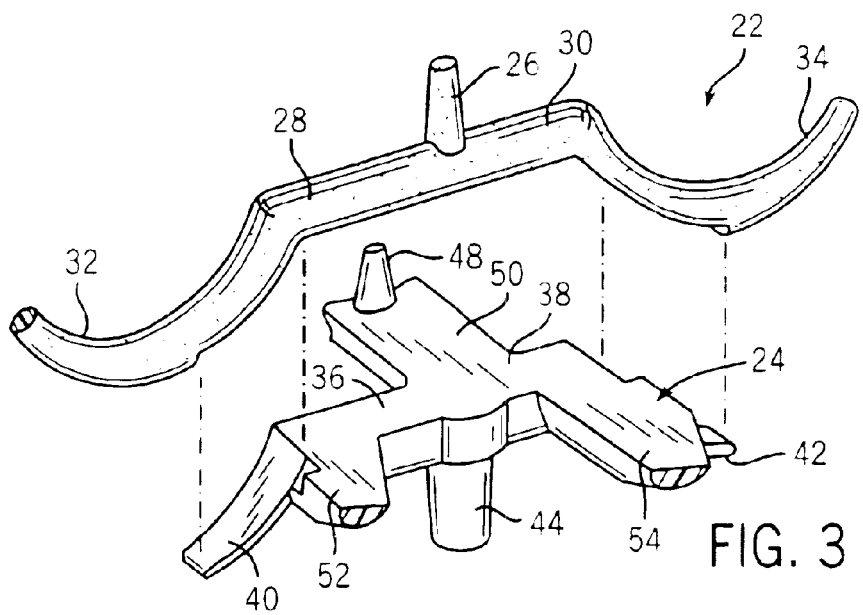
FIG. 3 is an exploded view of the multi-material runner of FIG. 2 showing the runner support structure separated from the remainder of the runner.

Referring now to FIGS. 2 and 3, the present invention provides a multi-material runner 20 having an elastic runner portion 22 molded together with a substantially inelastic runner support structure 24.

The elastic runner portion 22 includes a frusto-conical sprue 26 defined by a downwardly expanding passage receiving material directly from an injection nozzle (not shown). The sprue 26 connects to horizontally extending left and right runners 28 and 30 extending along a part line 12 of the mold (also not shown) and terminating in upwardly concave hook-shaped, left and right tunnel-gate portion 32 and 34, respectively. The outward tips of the left and right tunnel-gate portion 32 and 34 join to the molded part (not shown).

The under surface of the left and right runner 28 and 30 and the under surface of a portion of the left and right tunnel-gate portions 32 and 34 are joined to the upper surface of a conforming runner support structure 24. Specifically, the runner support structure 24 includes left and right extending runners 36 and 38, conforming and adhering, respectively, to the undersurface of upper, left and right runner 28 and 30. Likewise, left and right tunnel-gate portions 40 and 42 of the runner support structure 24 conform and adhere to undersurfaces of upper, left and right tunnel-gate portions 32 and 38.

As mentioned, the material of the runner support structure 24 is selected to be relatively inelastic so as to reduce the flexing and stretching of the elastic runner portion 22. The materials of the runner support structure 24 and elastic runner portion 22 are preferably selected to adhere to each other when molded together, however, materials having low adhesion may be accommodated by introducing a surface roughness or teeth, molded at the interface of these elements, to promote such adhesion.

Referring still to FIGS. 2 and 3, the runner support structure 24 includes a post 44 extending downward from the junction of left and right runners 36 to engage with an injector pin used during the ejection of the molded part. In this way, the runner support structure 24 provides a rigid structure that may be acted upon by conventional ejector pin 46.

The runner support structure 24 also includes a frusto-conical sprue 48, similar and parallel to sprue 26, but laterally displaced from the sprue 26 to receive a different injector nozzle (not shown). Sprue 48 joins to runners 36 and 38 by means of laterally extending offset portion 50.

Extending from the runners 36 and 38 in the opposite direction of offset portion 50 are auxiliary runners 52 and 54 which provide path to auxiliary gates (not shown) to a mold cavity as will be described.

Figure 4:
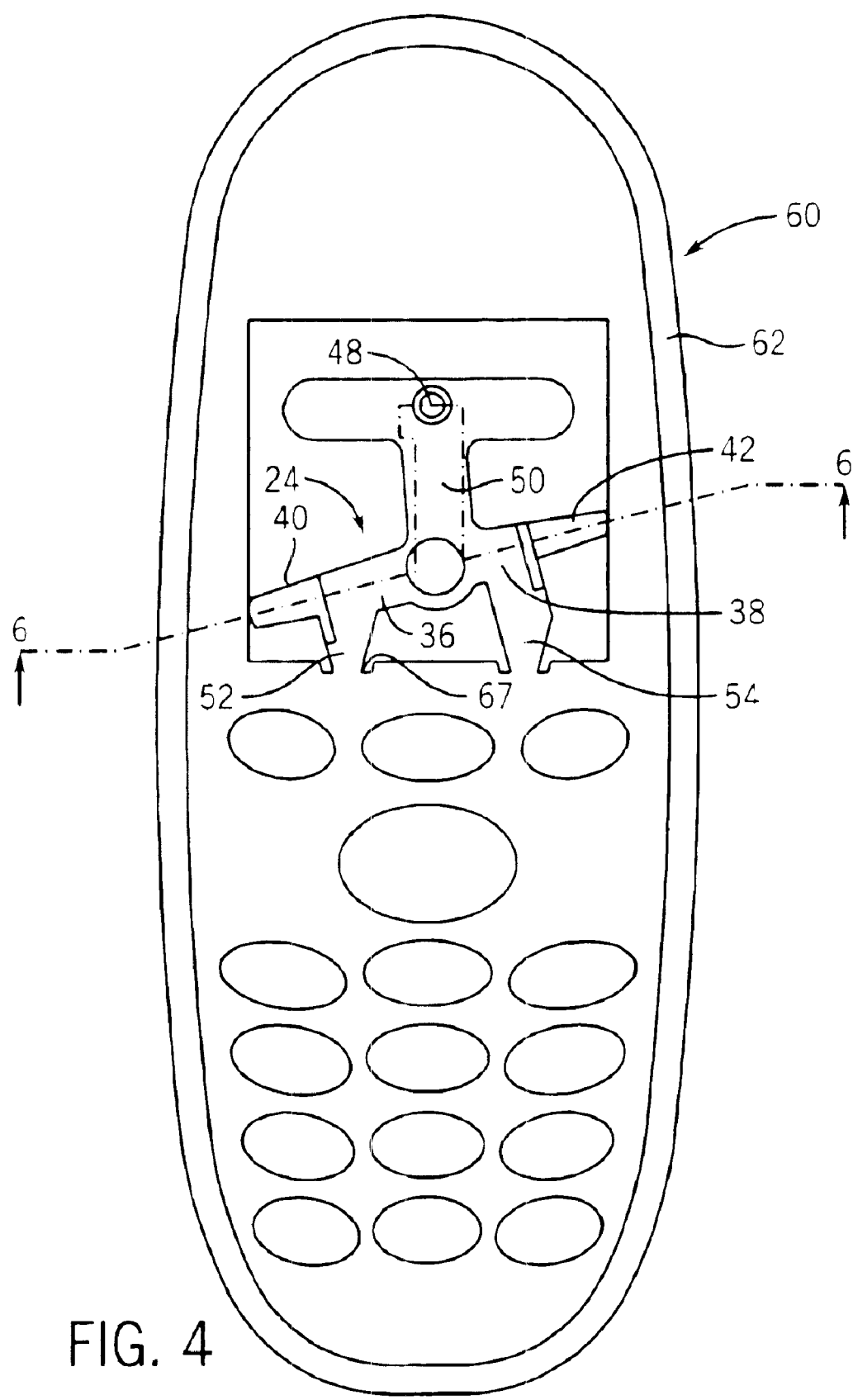
FIG. 4 is a top plan view of a plastic part having a core of substantially inelastic material introduced by auxiliary gates and runners leading from the runner support structure of FIG. 2 molded with the core.
Figure 5:
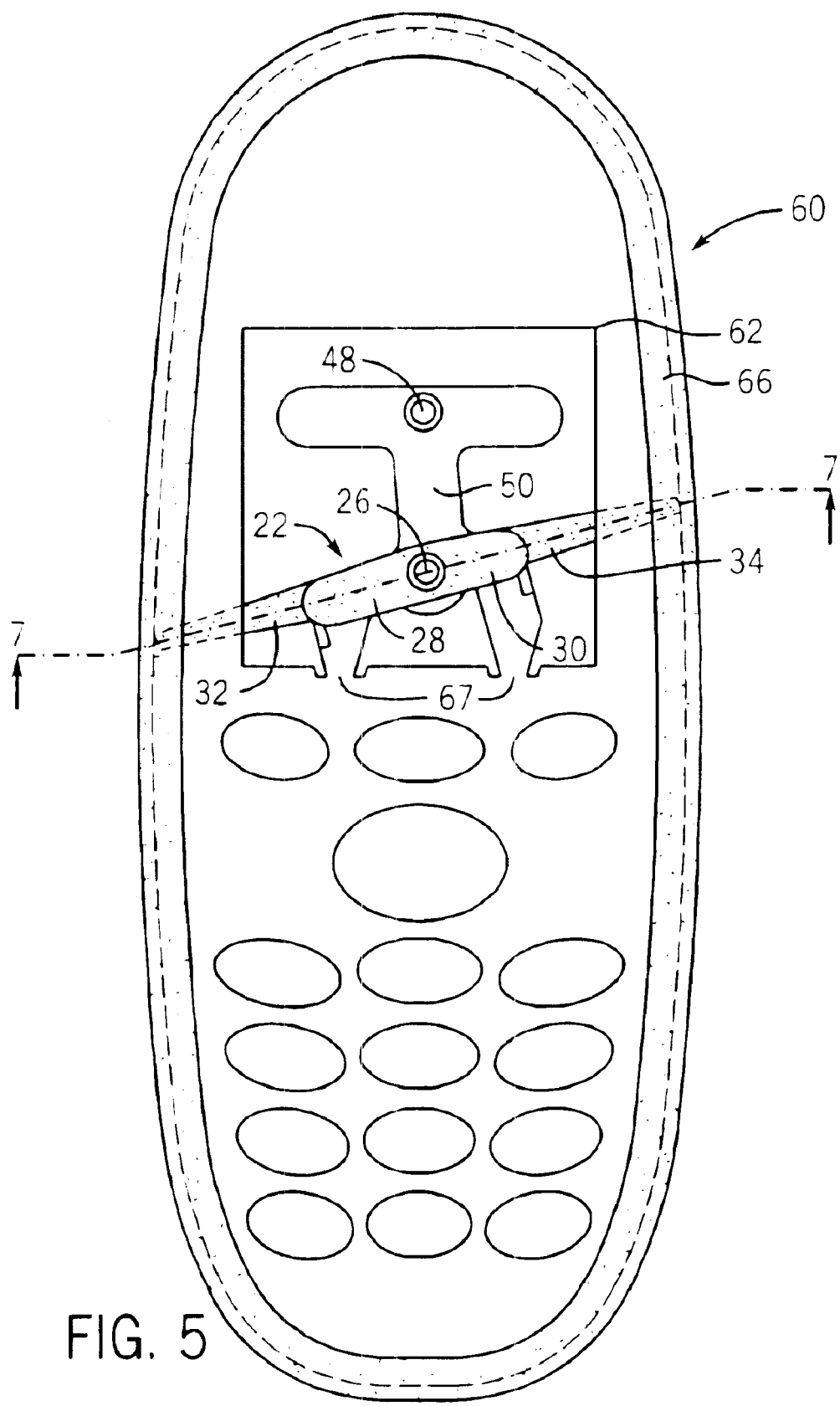
FIG. 5 is a figure similar to that of FIG. 4 showing an over molding of the core with an elastic material and the formation of the elastic portion of the runner of FIG. 2.

Referring now to FIGS. 4 and 5, the present invention is particularly well suited to "two shot" molding processes in which the molded part 60 to be produced includes, for example, a relatively inelastic core 62 over molded with an elastomeric outer coating 66. As used herein, "two-shot molding" refers to any molding operation where more than one material is injected into the mold cavity before ejection of the part.

When the invention is used in a two shot molding process, the runner support structure 24 may be molded at the time of the molding of the core elements, eliminating the need for additional process steps or materials. In this case, sprue 48 receives inelastic material into the offset portion 50 to form the lower left and right runners 36 and 38 and left and right tunnel-gate portions 40 and 42, and this same material is conducted through auxiliary runners 52 and 54 and auxiliary gates 67 to the part core 62.

Referring now to FIG. 5, the elastic material may now be injected through sprue 26 over the top of the runner support structure 24 to cover the lower, left and right runners 36 and 38 and lower left and right tunnel-gate portions 40 and 42 of the runner support structure 24 (shown in FIG. 4) forming the elastic runner portion 22 (consisting of upper, left and right runners 28 and 30 and upper, left and right tunnel-gate portions 32 and 34). Upper, left and right tunnel-gate portions 32 and 34 connect to the outer elastomeric coating 66 covering the core 62 and completing the part 60.

Figure 6:
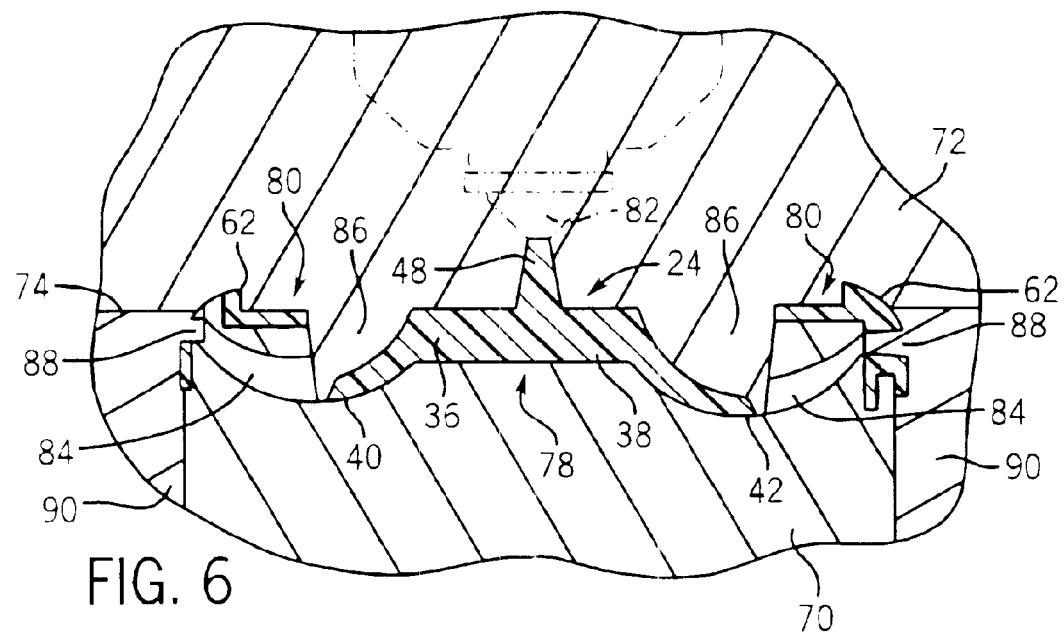
FIG. 6 is cross sectional view along line 6—6 of FIG. 4 showing first and second mold parts used producing the runner support structure in a restricted runner passage.

Referring now to FIGS. 4 and 6, the multi-material runner 20 of the present invention may be formed by a changing combination of different mold sections. During the molding of the core 62, (shown in FIG. 4) a first mold section 70 and a second mold section 72 join along a parting line 74 to provide restricted mold gate passage 78 and a mold cavity 80, defining the core 62. Injection of thermoplastic material through the sprue 26 by a first injector nozzle 82 simultaneously forms the runner support structure 24 and core 62.

A passageway 84 providing the remainder of the tunnel-gate is blocked from flow of material out of the runner support structure 24 by downwardly extending portions 86 of the second mold section 72. Similarly, flow of material from the core 62 into the passageway 84 is blocked by pins 88 of lateral mold sections 90 which press on the left and right about the first mold section 70.

Figure 7:
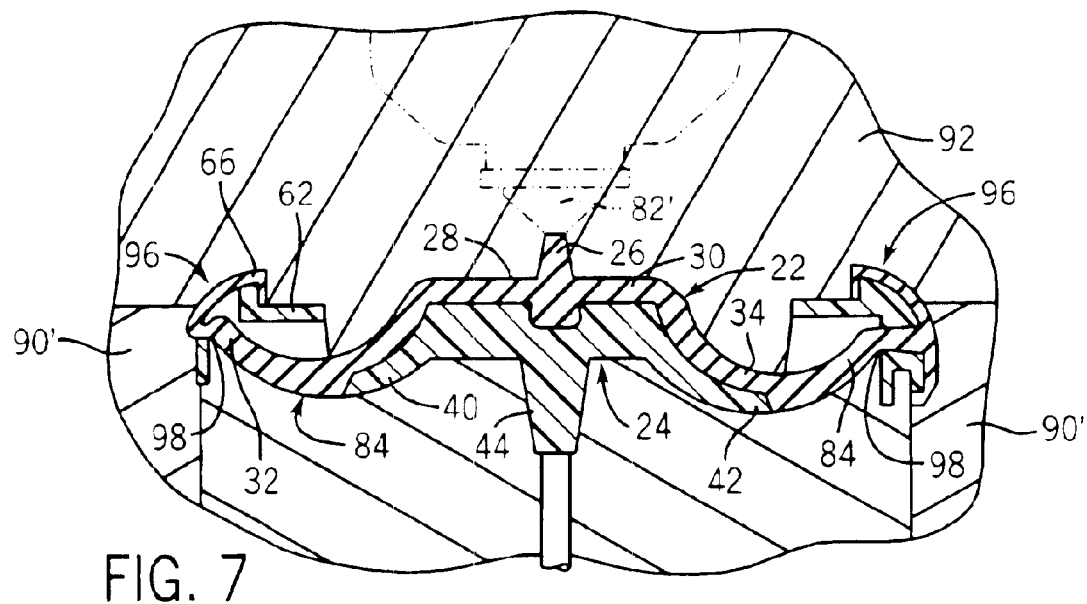
FIG. 7 is a cross sectional view along line 7—7 of FIG. 5 showing first and third mold parts forming a mold cavity having an unrestricted runner passage.

Referring now to FIGS. 5 and 7, after the runner support structure 24 and core 62 are molded, the second mold section 72 is removed and replaced with a third mold section 92 having new downwardly extending portions 86 that provide an unrestricted runner cavity that may receive elastic material from injector nozzle 82'. The unrestricted runner cavity provides a passage conforming to left and right runners 28 and 30 over the runner support structure 24 and joining the passageway 84.

The lateral mold sections 90 are replaced with mold sections 90', removing blocking pins 88 and allowing flow of elastomeric material through the passageway 84 into an expanded mold cavity section 96 provided by the third mold section 92 and mold section 90'.

When the molded part 60 (including core 62 and elastomeric outer coating 66) is removed, the multi-material runner 20 (including runner support structure 24 and elastic runner portion 22) is retained by the first mold section 70, causing a de-gating at the points 98.

It is specifically intended that the present invention not be limited to the embodiments and illustrations contained herein, but include modified forms of those embodiments including portions of the embodiments and combinations of elements of different embodiments as come within the scope of the following claims.

We claim:

1. A method of de-gating a molded part formed by injection of an elastomeric material in a mold cavity, the elastomeric material being introduced into the mold cavity through a runner passage and the de-gating removing a runner formed in the runner passage from the molded part, the method comprising the steps of:

(1) molding a runner support structure within a portion of the runner passage by the injection of a substantially inelastic material into the runner passage, the substantially inelastic material stopping before entry into the mold cavity from the runner passage, the inelastic material being substantially less elastic than the elastomeric material;

(2) molding the part by the injection of elastomeric material into the mold cavity through the runner passage past the substantially inelastic material into the mold cavity adjacent to the portion; and (3) de-gating a runner composed of both the substantially inelastic material and the elastic material by removing the runner from the molded part, the substantially inelastic material in the runner reducing stretching and breaking of the elastic material of the runner at locations away from the junction of the runner and the molded part.

2. The method of claim 1 wherein the molded part is a two-shot molded part having at least one portion molded of an elastomeric material and at least one portion molded of a substantially inelastic material wherein step (1) includes the step of molding a first portion of the part by the injection of the substantially inelastic material into the mold cavity via a second runner passage and wherein at step (2) a second portion of the part is molded using the elastomeric material.

3. The method of claim 1 wherein the molded part is a two-shot molded part and wherein step (1) includes the steps of:

(i) fitting a blocking structure into a portion of the runner passage to prevent complete filling of the runner passage with the substantially inelastic material during the molding of the runner support structure, and (ii) removing the blocking structure prior to step (2).

4. The method of claim 1 wherein the molded part is a two shot molded part wherein step (2) includes the steps of:

(i) fitting a blocking structure into a portion of the runner passage to prevent complete filling of the runner passage with the elastomeric material during the molding of the molded part, and (ii) removing the blocking structure prior to step (1).

5. The method of claim 1 wherein the mold has a part line separating two mold sections and wherein the runner passage includes a tunnel-gate passing along the part line then beyond the part line completely into one mold portion prior to entering the mold cavity.

6. The method of claim 5 wherein the runner support structure forms a portion of the runner furthest removed from the part line.

7. The method of claim 1 wherein the step (1) of molding the runner produces a tapered edge on an end of the runner support toward a junction of the runner and the molded part.

8. The method of claim 1 wherein the step runner support includes a surface adapted to receive an ejector pin.

* * * * *